United States Patent
Fontana et al.

(10) Patent No.: US 6,669,496 B1
(45) Date of Patent: Dec. 30, 2003

(54) DEVICE FOR CONNECTING BUS BARS

(75) Inventors: Rodolfo Fontana, Clivio (IT); Alessandro Leone, Seregno (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 09/830,296

(22) PCT Filed: Oct. 25, 1999

(86) PCT No.: PCT/EP99/08153
§ 371 (c)(1),
(2), (4) Date: Jun. 12, 2001

(87) PCT Pub. No.: WO00/27006
PCT Pub. Date: May 11, 2000

(30) Foreign Application Priority Data

Oct. 30, 1998 (IT) .......................................... MI98A2345

(51) Int. Cl.⁷ ................................................. F16B 9/00
(52) U.S. Cl. ........................ 439/213; 403/382; 403/403
(58) Field of Search ............................ 174/71 B, 72 B, 174/88 B, 133 B; 439/213; 403/205, 382, 293, 286, 187, 188, 403

(56) References Cited

U.S. PATENT DOCUMENTS

| | | | | |
|---|---|---|---|---|
| 3,287,487 A | * | 11/1966 | Fehr, Jr. ................... | 174/71 B |
| 3,919,603 A | * | 11/1975 | Salvati et al. ............... | 403/363 |
| D259,083 S | * | 5/1981 | Riegsecker .................. | D6/191 |
| 5,364,203 A | * | 11/1994 | Ishikawa .................... | 403/403 |
| 5,403,110 A | * | 4/1995 | Sammann .................... | 403/403 |
| 6,331,092 B1 | * | 12/2001 | Linger ........................ | 403/403 |

FOREIGN PATENT DOCUMENTS

| | | |
|---|---|---|
| DE | C-197 03 850 | 1/1998 |
| EP | A-0 032 418 | 7/1981 |

* cited by examiner

Primary Examiner—Neil Abrams
(74) Attorney, Agent, or Firm—Guido Modiano; Albert Josif; Daniel O'Byrne

(57) ABSTRACT

A device for connecting bus bars comprising a body made of conducting material which has three elements which lie along three substantially mutually perpendicular planes, of which:

- a first flat base element has a first outer side and a second outer side which are arranged in an L-shaped configuration with respect to each other, a third inner side and a fourth inner side being arranged in an L-shaped configuration with respect to each other and being substantially parallel to the corresponding outer sides;
- a second flat element is arranged along said first outer side of the first element;
- a third flat element is arranged along said second outer side or along said fourth inner side of the first element, the second flat element and the third flat element having such a length that their minimum relative distances allow the free passage of the bars, said first, second and third flat elements being further provided with a plurality of slots suitable to receive means for connection to the bars.

9 Claims, 3 Drawing Sheets

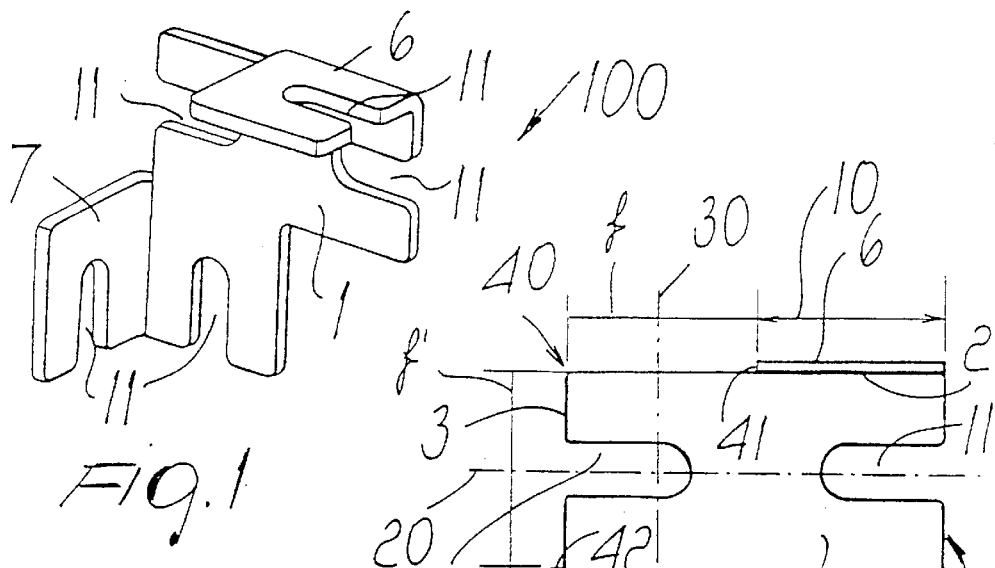
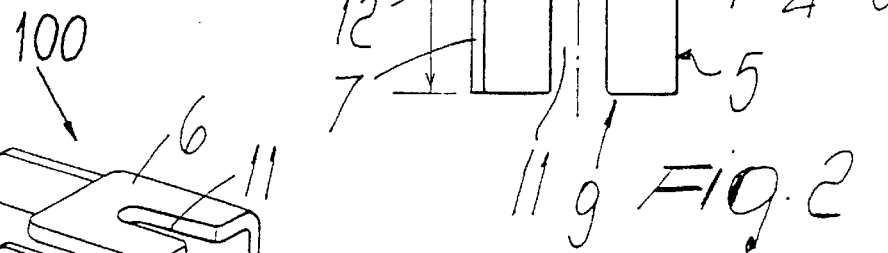
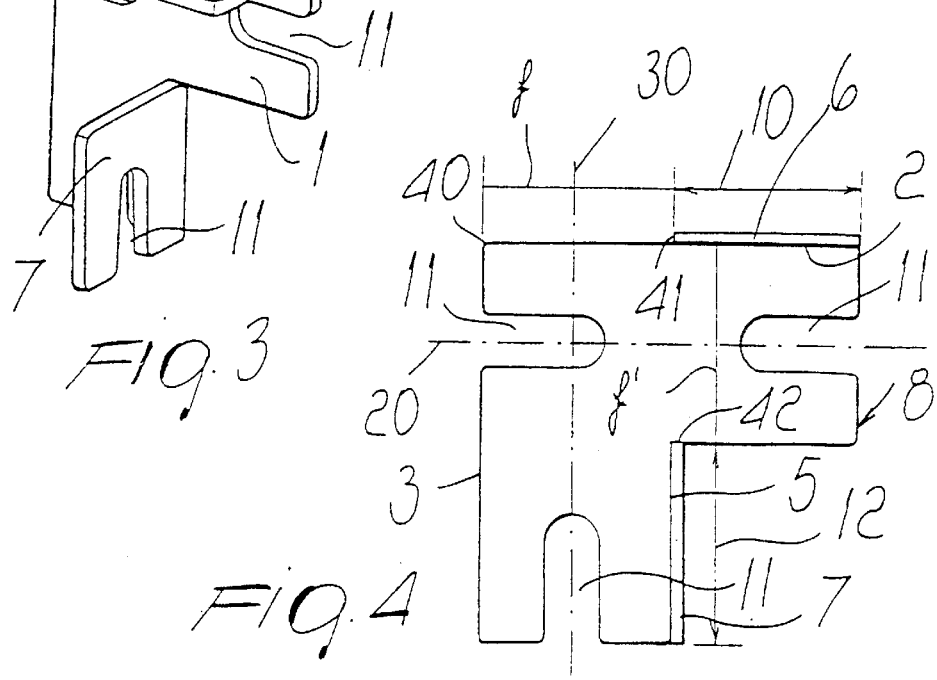

DEVICE FOR CONNECTING BUS BARS

BACKGROUND OF THE INVENTION

The present invention relates to a device for connecting bus bars having improved shape and characteristics.

More particularly, the connecting device according to the invention has a structure which allows to connect bus bars having any shape, be they variously shaped or flat, and with any connection configuration, being unique with respect to conventional devices owing to its extreme flexibility in use and to the simplicity of its production and assembly.

It is known that electric power distribution switchboards use, in order to distribute electric power to a plurality of electrical devices, such as for example circuit breakers, a system of mutually parallel metal bars which are arranged in an aligned or staggered configuration.

Each one of said bars is connected to a corresponding polarity of the electric power supply mains; the connection between the bus bars and the devices is provided by means of suitable conductors, such as for example laminae, which are shaped appropriately according to the type of device.

Inside the cabinets that accommodate the distribution switchboards, the configuration of the switchboards can be highly variable according to the different application requirements: thus, for example, the devices to which the bus bars are to be connected can vary in terms of type, shape and position; accordingly, the positions of the bars and the corresponding connection configurations to be provided are also extremely variable.

For example, two bars may be connected at right angles or in a T-shaped configuration or in other configurations, or a plurality of secondary bars may be connected along the entire extension of a same main bus bar which passes through one or more side-by-side cabinets.

In the current state of the art, these connections among bus bars are provided by virtue of connecting devices which have some drawbacks.

In particular, the main shortcoming of conventional connecting devices is their limited flexibility in use. If the mutual arrangement of the bus bars and their shape change, it is necessary to adopt differently shaped connecting devices, with consequent negative effects on production costs and on assembly difficulties.

An example in this regard is given by U.S. Pat. No. 5,364,203, which discloses a device for connecting two flat bus bars by means of an appropriately configured damper which is connected to the bars by means of bolts and nuts. Furthermore, the illustrated solution provides for bending the end portion of one of the two bars so as to surround laterally the other one and avoid any lateral shift thereof.

Although this solution is effective in the case of flat bars, it is entirely inapplicable to bars having different shapes and configurations; furthermore, the need to produce a hole in the bus bars and to bend them complicates production without significantly simplifying assembly in return. The fact should also be noted that when the bars to be connected conduct currents which have different amperages, the surface of contact between the connecting device and the bus bars must be sufficient to ensure correct and efficient conduction of the current between the bars. In the current state of the art, conventional devices are not suitable to universally connect the bus bars to each other, so that depending on the amperage levels involved it is necessary to adapt the dimensions of the devices to the specific practical application, entailing a consequent increase in production costs.

SUMMARY OF THE INVENTION

The aim of the present invention is to provide a device for connecting bus bars which is extremely flexible in use and allows, in particular, to connect bars having different shapes and with any mutual connecting arrangement.

Within the scope of this aim, an object of the present invention is to provide a device for connecting bus bars which is easy to manufacture and allows to significantly simplify the steps for connecting the bus bars inside electrical distribution switchboards.

Another object of the present invention is to provide a device for connecting bus bars which is capable of efficiently connecting bars that carry currents whose amperages are even considerably different from each other without having to modify the dimensions of said connecting device.

Another object of the present invention is to provide a device for connecting bus bars which is highly reliable, relatively easy to manufacture and at competitive costs.

This aim, these objects and others which will become apparent hereinafter are achieved by a device for connecting bus bars, characterized in that it comprises a body made of conducting material which has three elements which lie along three substantially mutually perpendicular planes, of which:

a first flat base element has a first outer side and a second outer side which are arranged in an L-shaped configuration with respect to each other, a third inner side and a fourth inner side being arranged in an L-shaped configuration with respect to each other and being substantially parallel to the corresponding outer sides;

a second flat element is arranged along said first outer side of the first element;

a third flat element is arranged along said second outer side or along said fourth inner side of the first element, the second flat element and the third flat element having such a length that their minimum relative distances allow the free passage of the bars, said first, second and third flat elements being further provided with a plurality of slots suitable to receive means for connection to the bars.

The connecting device according to the invention has the considerable advantage of allowing the connection of bus bars of any kind and shape, even flat ones; furthermore, the structure of the connecting device allows to connect the bus bars very simply and effectively, regardless of the bar connection configuration to be obtained and regardless of their arrangement inside the cabinets of the distribution switchboards.

BRIEF DESCRIPTION OF THE DRAWINGS

Further characteristics and advantages of the invention will become apparent from the description of preferred but not exclusive embodiments of the connecting device according to the invention, illustrated only by way of non-limitative example in the accompanying drawings, wherein:

FIG. 1 is a perspective view of a first preferred embodiment of the connecting device according to the invention;

FIG. 2 is a top plan view of the connecting device of FIG. 1;

FIG. 3 is a perspective view of a second embodiment of the connecting device according to the invention;

FIG. 4 is a top plan view of the connecting device of FIG. 3;

DESCRIPTION OF THE PREFERRED EMBODIMENTS

Figure 5:
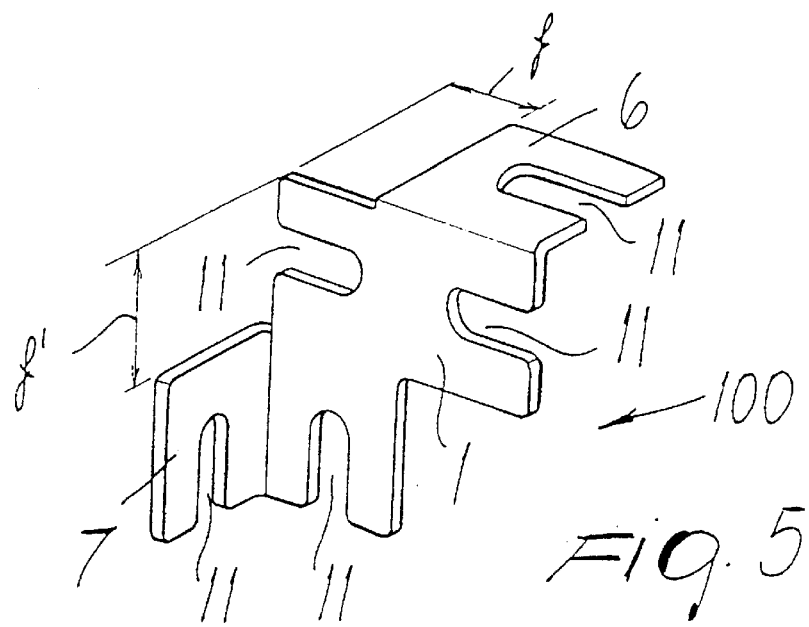
FIG. 5 is a perspective view of a third embodiment of the connecting device according to the invention.

With reference to the above Figures, the connecting device according to the invention, generally designated by the reference numeral 100, is constituted by a single body made of conducting material, for example copper, which comprises three elements which lie on three main planes. In particular, as shown in detail in FIG. 2, the connecting device 100 has a first flat base element 1 which has a first outer side 2 and a second outer side 3, which are arranged in an L-shaped configuration with respect to each other, and a third inner side 4 and a fourth inner side 5, which are arranged in an L-shaped configuration with respect to each other and are substantially parallel to the corresponding outer sides 2 and 3.

As shown in FIG. 2, the pairs constituted by the outer side 2 and the inner side 4 and by the outer side 3 and the inner side 5 are mutually connected respectively by the sides 8 and 9 that form the remaining perimetric portion of the flat base element 1.

A second flat element 6 and a third flat element 7 protrude from the base element 1 and are arranged so that the three flat elements 1, 6 and 7 are substantially perpendicular to each other. As shown in FIGS. 1 and 2, in a preferred embodiment of the connecting device according to the invention each one of the two flat elements 6 and 7 is arranged along a corresponding outer side, respectively 2 and 3, of the base element 1; in particular, the second flat element 6 and the third flat element 7 are arranged respectively at one end of the first outer side 2 and of the second outer side 3. Moreover, the flat elements 6 and 7 have identical lengths 10 and 12 thanks to which their mutual distances f and f' allow the free passage of the bars to be connected. The mutual distances f and f' are to be understood respectively as the distance between the end 41 of the element 6 and the plane on which said element 7 lies, and as the distance between the end 42 of the element 7 and the plane on which the element 6 lies.

As an alternative, the lengths of the two flat elements 6 and 7 may also be mutually different, so long as the distances f and f' still allow the bars to pass freely.

This allows to have a structure of the connecting device which is compact in shape and extremely effective in application; the outside perimeter of the connecting device at the corner region 40 is in fact free from lateral protrusions and allows the bars to be connected to slide in both of the directions defined by the axes 20 and 30. In this manner it is possible, for example, to connect the bus bars in a vertical, horizontal or inverted T-shaped configuration, in a right-angled configuration etc., and in any position along their longitudinal extension.

Figure 6:
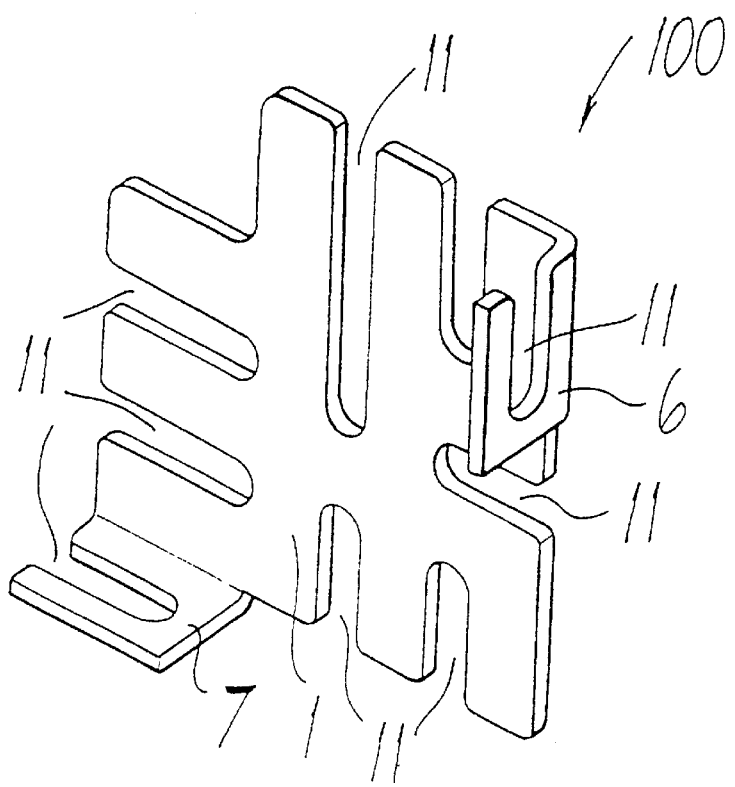
FIG. 6 is a perspective view of a fourth embodiment of the connecting device according to the invention.

Advantageously, the three flat elements 1, 6 and 7 also have a plurality of slots 11 which allow connection between the connecting device and the bus bars thanks to adapted fixing means, such as for example bolts. The slots have a U-shaped profile and are conveniently located on the surface of the three elements so as to ensure extreme flexibility in the position for fixing with respect to the bars. For example, the base element 1 comprises three U-shaped slots 11: two are arranged along the same axis 20 with oppositely orientated profiles and a third one is arranged along an axis 30 which is perpendicular to the axis of the first two, while the two planes 6 and 7 comprise one slot each. This arrangement is obviously to be understood merely as an example, since the shape, the dimensions, the number and the arrangement of the U-shaped slots, as well as the dimensions of the three flat elements 1, 6 and 7, may be any according to the applications and/or according to specific requirements; an example in this regard is shown in FIG. 6, which illustrates a fourth embodiment of the connecting device according to the invention.

In a second embodiment, shown in FIGS. 3 and 4, the second flat element 6 and the third flat element 7 are arranged respectively at the end of a first outer side 2 and at the end of the inner side 5 that corresponds to the second outer side 3. In this case also, the relative distance between the two flat elements 6 and 7 must allow the bars to pass freely.

Furthermore, the second and third flat elements 6 and 7 can be arranged on the same half plane with respect to the base element 1, as shown in FIG. 1, or as an alternative, if required by the application, they may be arranged on opposite half planes with respect to said base element 1, as shown in FIG. 5.

Another advantageous aspect of the connecting device according to the invention is the fact that it can be obtained from a single die-cut and appropriately folded metal plate, being different from conventional devices in its extremely simple and low-cost production.

A further considerable advantage of the connecting device according to the invention lies in the fact that its surface extension allows to increase the regions of contact with the associated bus bars and to improve their conducting capabilities, allowing in particular to connect bars that conduct currents whose values differ even considerably without having to adopt different dimensions according to the instances of practical application.

Figure 7:
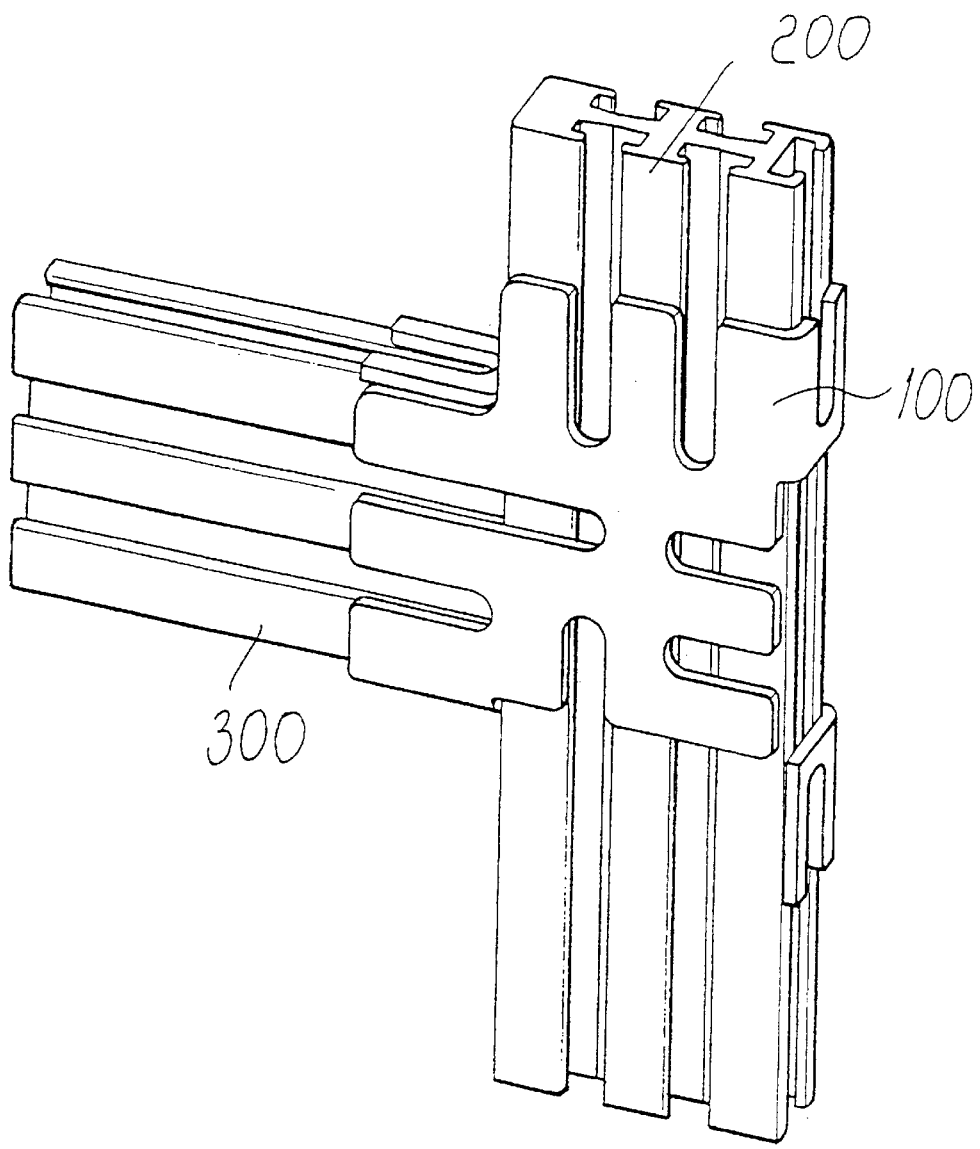
FIG. 7 is a perspective view of a connection between shaped bus bars by means of the connecting device of FIG. 6.

In practice it has been observed that the connecting device according to the invention fully achieves the intended aim, since it allows to provide connections between bus bars having the most disparate shapes and with any connection configuration according to a solution which is simple, cheap and at the same time effective. An example of possible connection between bus bars is shown in FIG. 7, in which two shaped bars 200 and 300 are mutually coupled in a T-shaped configuration by means of a connecting device 100; the connecting device and the bars are then mutually fixed thanks to conventional fixing means, such as a T-shaped bolt, not shown in the Figure for the sake of simplicity in illustration.

The device according to the invention is particuraly suitable for use in electric switchboards; in fact, electric switchboards generally comprise a plurality of electrical devices, such as circuit breakers and the like, which are electrically connected to corresponding bus bars in a manner which is well known in the art; advantageously, the connecting device according to the invention can be used in order to connect a couple of bars, as previously described.

Accordingly, the present invention also relates to an electric switchboard comprising a plurality of electrical devices, such as circuit breakers and the like, which are electrically connected to corresponding bus bars, characterized in that it comprises a connecting device according to the invention.

The connecting device thus conceived is susceptible of numerous modifications and variations, all of which are within the scope of the inventive concept; for example, the U-shaped slots can have a different profile, or they can be substituted by holes. All the details may furthermore be replaced with other technically equivalent elements.

In practice, the materials used, so long as they are compatible with the specific use, as well as the dimensions, may be any according to the requirements and the state of the art.

What is claimed is:

1. A device for connecting bus bars, comprising a single body made of conducting material which has three elements which lie along three substantially mutually perpendicular planes, of which:

a first flat base element has a first outer side and a second outer side which are arranged in an L-shaped configuration with respect to each other, a third inner side and a fourth inner side being arranged in an L-shaped configuration with respect to each other and being substantially parallel to the corresponding outer sides;

a second flat element is arranged along said first outer side of the first element;

a third flat element is arranged along said second outer side or along said fourth inner side of the first element, the second flat element and the third flat element being arranged along the corresponding sides so that their minimum relative distances, considered as the distance between one end of the second element and the plane on which the third element lies, and the distance between one end of the third element and the plane on which the second element lies, respectively, allow the free passage of the bars, said first, second and third flat elements being further provided with a plurality of slots suitable to receive means for connection to the bars.

2. The device according to claim 1, wherein the second flat element and the third flat element are arranged respectively at one end of said first outer side and of said second outer side of the first element.

3. The device according to claim 1, wherein the second flat element and the third flat element are arranged respectively at one end of said first outer side and at one end of the fourth inner side that corresponds to the second outer side.

4. The device according to claim 1, wherein the second flat element and the third flat element are arranged on a same half plane with respect to the first flat base element.

5. The device according to claim 1, wherein the second flat element and the third flat element are arranged on opposite half planes with respect to the first flat base element.

6. The device according to claim 1, wherein said slots have a U-shaped profile.

7. The device according to claim 1, wherein the second flat element and the third flat element have the same length.

8. The device according to claim 1, wherein it is formed from a single die-cut and bent metal plate.

9. An electric switchboard comprising a plurality of electrical devices, such as circuit breakers and the like, which are electrically connected to corresponding bus bars, comprising a connecting device further comprising a single body made of conducting material which has three elements which lie along three substantially mutually perpendicular planes, of which:

a first flat base element has a first outer side and a second outer side which are arranged in an L-shaped configuration with respect to each other, a third inner side and a fourth inner side being arranged in an L-shaped configuration with respect to each other and being substantially parallel to the corresponding outer sides;

a second flat element is arranged along said first outer side of the first element;

a third flat element is arranged along said second outer side or along said fourth inner side of the first element, the second flat element and the third flat element being arranged along the corresponding sides so that their minimum relative distances, considered as the distance between one end of the second element and the plane on which the third element lies, and the distance between one end of the third element and the plane on which the second element lies, respectively, allow the free passage of the bars, said first, second and third flat elements being further provided with a plurality of slots suitable to receive means for connection to the bars.

* * * * *